(12) United States Patent
Chen

(10) Patent No.: US 7,050,528 B2
(45) Date of Patent: May 23, 2006

(54) CORRECTION OF CT IMAGES FOR TRUNCATED OR INCOMPLETE PROJECTIONS

(75) Inventor: Guang-Hong Chen, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 0 days.

(21) Appl. No.: 10/955,459

(22) Filed: Sep. 30, 2004

(65) Prior Publication Data

US 2006/0067458 A1 Mar. 30, 2006

(51) Int. Cl.
*A61B 6/00* (2006.01)
(52) U.S. Cl. .......................................... 378/4; 378/901
(58) Field of Classification Search .................... 378/4, 378/15, 19, 207, 901
See application file for complete search history.

(56) References Cited

U.S. PATENT DOCUMENTS

| 4,258,096 A | 3/1981 | LaMarche ................... 428/209 |
| 4,305,127 A | 12/1981 | Heuscher ..................... 600/425 |
| 4,550,371 A | 10/1985 | Glover et al. .................. 378/4 |
| 5,043,890 A | 8/1991 | King ........................... 382/279 |
| 5,533,080 A | 7/1996 | Pelc ............................... 378/5 |
| 6,307,909 B1 | 10/2001 | Flohr et al. .................... 378/4 |

*Primary Examiner*—Courtney Thomas
(74) *Attorney, Agent, or Firm*—Quarles & Brady LLP

(57) ABSTRACT

A data consistency condition is derived for an array of attenuation values acquired with a fan-beam x-ray CT system. Using this data consistency condition, estimates of selected attenuation values can be calculated from the other attenuation values acquired during the scan. Such estimates reduce artifacts caused truncated data and by loss of data due to x-ray absorption.

8 Claims, 4 Drawing Sheets

CORRECTION OF CT IMAGES FOR TRUNCATED OR INCOMPLETE PROJECTIONS

This invention was made with government support under Grant No. 1R21 EB001683-01 awarded by the National Institute of Health. The United States Government has certain rights in this invention.

BACKGROUND OF THE INVENTION

The field of the present invention is computed tomography and, particularly, computer tomography (CT) scanners used to produce medical images from x-ray attenuation measurements.

As shown in FIG. 1, a CT scanner used to produce images of the human anatomy includes a patient table 10 which can be positioned within the aperture 11 of a gantry 12. A source of highly columinated x-rays 13 is mounted within the gantry 12 to one side of its aperture 11, and one or more detectors 14 are mounted to the other side of the aperture. The x-ray source 13 and detectors 14 are revolved about the aperture 11 during a scan of the patient to obtain x-ray attenuation measurements from many different angles through a range of at least 180° of revolution.

A complete scan of the patient is comprised of a set of x-ray attenuation measurements which are made at discrete angular orientations of the x-ray source 13 and detector 14. Each such set of measurements is referred to in the art as a "view" and the results of each such set of measurements is a transmission profile. As shown in FIG. 2A, the set of measurements in each view may be obtained by simultaneously translating the x-ray source 13 and detector 14 across the acquisition field of view, as indicated by arrows 15. As the devices 13 and 14 are translated, a series of x-ray attenuation measurements are made through the patient and the resulting set of data provides a transmission profile at one angular orientation. The angular orientation of the devices 13 and 14 is then changed (for example, 1°) and another view is acquired. An alternative structure for acquiring each transmission profile is shown in FIG. 2B. In this construction, the x-ray source 13 produces a fan-shaped beam which passes through the patient and impinges on an array of detectors 14. Each detector 14 in this array produces a separate attenuation signal and the signals from all the detectors 14 are separately acquired to produce the transmission profile for the indicated angular orientation. As in the first structure, the x-ray source 13 and detector array 14 are then revolved to a different angular orientation and the next transmission profile is acquired.

As the data is acquired for each transmission profile, the signals are filtered, corrected and digitized for storage in a computer memory. These steps are referred to in the art collectively as "preprocessing" and they are performed in real time as the data is being acquired. The acquired transmission profiles are then used to reconstruct an image which indicates the x-ray attenuation coefficient of each voxel in the reconstruction field of view. These attenuation coefficients are converted to integers called "CT numbers", which are used to control the brightness of a corresponding pixel on a CRT display. An image which reveals the anatomical structures in a slice taken through the patient is thus produced.

The reconstruction of an image from the stored transmission profiles requires considerable computation and cannot be accomplished in real time. The prevailing method for reconstructing images is referred to in the art as the filtered back projection technique.

Referring to FIG. 3, the proper reconstruction of an image requires that the x-ray attenuation values in each view pass through all of the objects located in the aperture 11. If the object is larger than the acquired field of view, it will attenuate the values in some transmission profiles as shown by the vertically oriented view in FIG. 3, which encompasses the supporting table 10, and it will not attenuate the values in other transmission profiles as shown by the horizontally oriented view in FIG. 3. As a result, when all of the transmission profiles are back projected to determine the CT number of each voxel in the reconstructed field of view, the CT numbers will not be accurate. This inaccuracy caused by truncated projection data can be seen in the displayed image as background shading which can increase the brightness or darkness sufficiently to obscure anatomical details.

A similar problem is presented when transmission profiles are affected by metal objects such as dental filings in the patient being scanned. In this situation x-rays passing through the metal object are strongly absorbed and the attenuation measurement is very noisy causing strong artifacts in the reconstructed image.

The data truncation problem and the x-ray absorption problem each corrupt the acquired attenuation data set in a unique way. Referring to FIG. 4, as views of the attenuation data are acquired the attenuation values 32 in each view are stored on one row of a two dimensional data array 33. As indicated by the dashed line 34, each such row of attenuation data provides a transmission profile of the object to be imaged when viewed from a single view angle. One dimension of the data array 33 is determined by the number of views which are acquired during the scan and the other dimension is determined by the number of detector cell signals acquired in each view.

Referring particularly to FIG. 5A, the truncated data problem can be visualized as a set of contiguous views 36 in the acquired data array 33 that are corrupted because they include attenuation information from objects (e.g., supporting table, patient's shoulder or arms) outside the field of view of all the remaining acquired views. On the other hand, as shown in FIG. 5B the absorbed x-ray problem can be visualized as the corruption of one or more attenuation values in all, or nearly all the acquired views as indicated at 38. In the first problem a select few of the acquired views are significantly affected and in the second problem all or nearly all the acquired views are affected in a more limited manner.

SUMMARY OF THE INVENTION

The present invention is a method for correcting individual attenuation values in fan-beam projections that have been corrupted. More particularly, the present invention is a method which employs a novel fan-beam data consistency condition to estimate individual attenuation measurements in one acquired fan-beam projection view from attenuation measurements made at the other view angles. Corrupted data acquired during a scan is replaced with estimated values produced according to this method.

A general object of the invention is to replace corrupted x-ray attenuation data acquired during a scan with attenuation data calculated from other, uncorrupted attenuation data acquired during the scan. The estimated and replaced attenuation data may be one or more entire attenuation profiles as occurs when correcting data truncation problems, or it may be selected attenuation values in one or more attenuation profiles as occurs when correcting x-ray absorption problems.

GENERAL DESCRIPTION OF THE INVENTION

It is well known that if all the projection data are summed in one view of non-truncated parallel-beam projections, the result is a view angle independent constant. Mathematically, this is a special case (zero-order moment) of the so-called Helgason-Ludwig consistency condition on two-dimensional Radon transforms. Physically, this condition states that the integral of the attenuation coefficients over the whole transmission profile should be a view angle independent constant. This data consistency condition (DCC) plays an important role in correcting the X-ray CT image artifacts when some projection data are missing in parallel beam scans. In practice, this may happen when a portion of a scanned object is positioned outside the scan field-of-view (FOV) defined by a CT scanner.

A novel data consistency condition is derived here which enables estimation of attenuation values for fan-beam projections. It will be called a fan-beam data consistency condition (FDCC). The new FDCC explicitly gives an estimation of the projection data for a specific ray by filtering all the available fan-beam projections twice. To derive the FDCC, the following definition of a fan-beam projection $g[\vec{r}, \vec{y}(t)]$ is used as the starting point $$g[\vec{r}, \vec{y}(t)] = \int_0^\infty ds f[\vec{y}(t) + s\vec{r}]. \quad (1)$$

Figure 6:
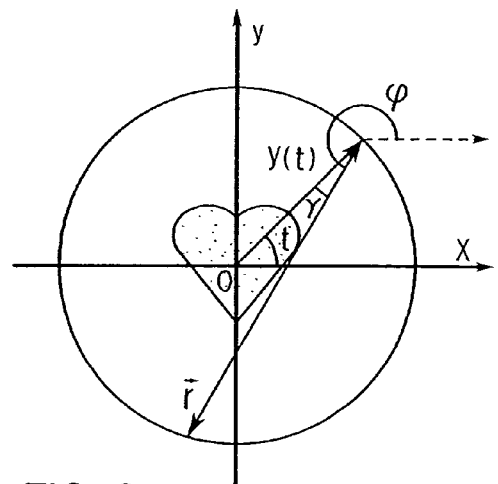
FIG. 6 is a graphic representation of an x-ray beam scan which shows the geometric parameters used to derive data consistency condition.

The source trajectory vector $\vec{y}(t)$ is parameterized by a parameter t, and r is a vector starting from the source position to the image object as shown in FIG. 6. The vector $\vec{y}(t)$ denotes a source position and the vector $\vec{r}$ represents a vector from the x-ray source to the imaged object. In a laboratory coordinate system o—xy, the vector $\vec{y}(t)$ is parameterized by a polar angle t, and the vector $\hat{r}$ is parameterized by polar angle $\phi$. The fan angle $\gamma$ is also defined from the iso-ray. All the angles have been defined according to a counterclockwise convention. The image function $f(\vec{x})$ is assumed to have a compact support $\Omega$, i.e., it is non-zero only in a finite spatial region. Throughout this discussion, a vector will be decomposed into its magnitude and a unit vector, e.g. $\vec{r} = r\hat{r}$. Although a circular scanning geometry is shown in FIG. 6, the present invention may be employed in any geometry and a general vector notation is used herein to reflect this fact.

Eq. (1) defines a homogeneous extension of the conventional fan-beam projections $\bar{g}[\hat{r}, \vec{y}(t)]$. That is $$g[\vec{r}, \vec{y}(t)] = \frac{1}{r}\bar{g}[\hat{r}, \vec{y}(t)] = \frac{1}{r}\int_0^\infty ds f[\vec{y}(t) + s\hat{r}]. \quad (2)$$

A Fourier transform $G[\vec{k}, \vec{y}(t)]$ of the generalized fan-beam projection $g[\vec{r}, \vec{y}(t)]$ with respect to variable $\vec{r}$ is defined as $$G[\vec{k}, \vec{y}(t)] = \int_{\Re^2} d^2r g[\vec{r}, \vec{y}(t)]\exp(-2\pi i \vec{k}\cdot\vec{r}). \quad (3)$$

Note that this Fourier transform is local, since the Fourier transform is taken with respect to the vectors that emanate from a source position labeled by $\vec{y}(t)$.

By choosing a separate polar coordinate system for vectors $\vec{k}$ and $\vec{r}$ and using Eq. (2), the Fourier transform $G[\vec{k}, \vec{y}(t)]$ can be factorized into the product of a divergent radial component $$\frac{1}{k}$$

and an angular component $\bar{G}[\hat{k}, \vec{y}(t)]$. That is $$G[\vec{k}, \vec{y}(t)] = \frac{1}{k}\bar{G}[\hat{k}, \vec{y}(t)]. \quad (4)$$

Here $\bar{G}[\hat{k}, \vec{y}(t)]$ is similarly defined by Eq. (3), but the vector $\vec{k}$ is replaced by a unit vector $\hat{k}$.

A connection between $G[\vec{k}, \vec{y}(t)]$ and the Fourier transform $\tilde{f}(\vec{k})$ of the object function $f(\vec{x})$ can be established by inserting Eq. (1) and Eq. (2) into Eq. (3). The result is $$G[\vec{k}, \vec{y}(t)] = \frac{1}{k}\int_0^\infty ds \tilde{f}(s\hat{k})\exp[i2\pi s\hat{k}\cdot\vec{y}(t)]. \quad (5)$$

Compared to Eq. (4), the angular component $\bar{G}[\hat{k}, \vec{y}(t)]$ is given by $$\bar{G}[\hat{k}, \vec{y}(t)] = \int_0^\infty dk \tilde{f}(k\hat{k})\exp[i2\pi k\hat{k}\cdot\vec{y}(t)] \quad (6)$$

The presence of the integral in Eq. (6) indicates that the function $\overline{G}[\hat{k}, \vec{y}(t)]$ does not explicitly depend on the vector $\vec{y}(t)$. Rather, the function $\overline{G}[\hat{k}, \vec{y}(t)]$ depends directly on the projection of vector $\vec{y}(t)$ onto a given unit vector $\hat{k}$. Therefore, it is appropriate to introduce a new variable $$p = \hat{k} \cdot \vec{y} \qquad (7)$$

and rebin the data $\overline{G}[\hat{k}, \vec{y}(t)]$ into $G_r(\hat{k}, p)$ by the following relation $$\overline{G}[\hat{k}, \vec{y}(t)] = G_r(\hat{k}, p = \hat{k} \cdot \vec{y}(t)). \qquad (8)$$

Using Eqs. (7) and (8), Eq. (6) can be rewritten as $$G_r(\hat{k}, p) = \int_0^\infty dk \tilde{f}(k\hat{k}) \exp(i2\pi kp) \qquad (9)$$

From the definition given in Eq. (3), it is apparent that the function $G_r(k, p)$ is a complex function, and thus has both an imaginary part and a real part. In general, the imaginary part and the real part of the function $G_r(\hat{k}, p)$ are not correlated with one another. However, Eq. (9) imposes a strong constraint relating the imaginary and real parts of the function $G_r(\vec{k}, p)$. To better understand this hidden constraint, the following fact is insightful. The variable $\vec{k}$ is the magnitude of the vector $\hat{k}$, and thus it is intrinsically a non-negative number. Using this property, Eq. (9) may be extended to the range of $(-\infty, +\infty)$ by introducing a following function $$Q(\hat{k}, k) = \begin{cases} \tilde{f}(k\hat{k}) & k \geq 0 \\ 0 & k < 0 \end{cases} \qquad (10)$$

In other words, function $Q(\hat{k}, k)$ is a causal function with respect to the variable k. Using the function $Q(\hat{k}, k)$, Eq. (9) can be written as:

$$G_r(\hat{k}, p) = \int_{-\infty}^{+\infty} dk Q(\hat{k}, k) \exp(i2\pi pk) \qquad (11)$$

Therefore, a standard inverse Fourier transforms yields:

$$Q(\hat{k}, k) = \int_{-\infty}^{+\infty} dp G_r(\hat{k}, p) \exp(-i2\pi pk) \qquad (12)$$

Figure 7:
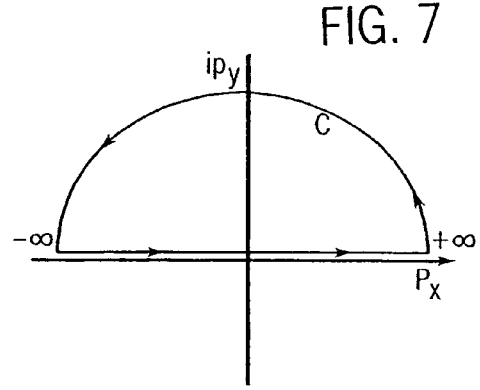
FIG. 7 is a graphic representation used in the derivation of the data consistency condition.

Note that function $Q(\hat{k},k)$ satisfies the causal structure dictated by Eq. (10). This fact implies that, for negative k, the integral in Eq. (12) should universally converge and that the value of the integral should be zero. Therefore, the integral must be done in the upper half of the complex p—plane. In addition, according to a known mathematical theorem, the causal structure in Eq. (10) and (12) requires the function Gr (k, p) to be analytical in the upper half of the complex p—plane. An intuitive argument is also beneficial in order to demonstrate that the function $G_r(\hat{k}, p)$ is analytical in the upper half of the complex p—plane. For negative k, the contour of integration for Eq. (12) should be closed by a large semicircle that encloses the upper half of the complex plane as shown in FIG. 7. By Cauchy's theorem, the integral will vanish if $G_r(\hat{k}, p)$ is analytic everywhere in the upper half plane. Thus, the intuitive argument also leads to the conclusion that the function $G_r(\hat{k}, p)$ is analytical in the upper half of the complex p—plane.

The complex function $G_r(\hat{k}, p)$ may be separated into a real part and an imaginary part as $$G_r(\hat{k}, p) = Re\, G_r(\hat{k},p) + i\, Im\, G_r(\hat{k}, p). \qquad (13)$$

The causal structure implied in Eq. (10) and the concomitant analytical structure shown in FIG. 7 require that the real part and imaginary part of the function $G_r(\hat{k}, p)$ are mutually linked in the following way:

$$Re G_r(\hat{k}, p) = \frac{1}{\pi} \wp \int_{-\infty}^{+\infty} dp' \frac{Im G_r(\hat{k}, p')}{p' - p} \qquad (14a)$$

$$Im G_r(\hat{k}, p) = \frac{1}{\pi} \wp \int_{-\infty}^{+\infty} dp' \frac{Re G_r(\hat{k}, p')}{p' - p}, \qquad (14b)$$

where the symbol $\wp$ represents Cauchy principal value. In other words, the imaginary part and real part of the function $G_r(\hat{k},p)$ are related to each other by a Hilbert transform.

The imaginary part and real part of function $\overline{G}[\hat{k}, \vec{y}(t)]$ have been explicitly calculated. The final results are $$Re\overline{G}[\hat{k}, \vec{y}(t)] = \frac{1}{2} \int_0^{2\pi} d\varphi \delta(\hat{k} \cdot \hat{r}) \overline{g}[\hat{r}, \vec{y}(t)] \qquad (15)$$

$$Im\overline{G}[\hat{k}, \vec{y}(t)] = -\frac{1}{2\pi} \int_0^{2\pi} d\varphi \frac{\overline{g}[\hat{r}, \vec{y}(t)]}{\hat{k} \cdot \hat{r}}. \qquad (16)$$

Figure 8:
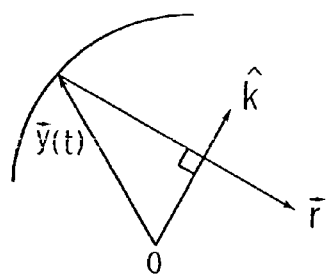
FIG. 8 is a graphic representation showing the relationship of vectors.

Here the angular variable φ is the azimuthal angle of the unit vector $\hat{r}$, i.e. $\hat{r}=(\cos\varphi, \sin\varphi)$. An important observation is that there is a Dirac δ—function in Eq. (15). As shown in FIG. 8, for a given unit vector $\hat{k}$ and source position $\vec{y}(t)$, the real part $Re\overline{G}[\hat{k}, \vec{y}(t)]$ is completely determined by a single ray along the direction $\hat{r}=\vec{k}^\perp$. Note that the clockwise convention has been chosen to define the unit vector $\hat{r}$ from a given unit vector $\hat{k}$. Thus, the real part is given by:

$$Re\overline{G}[\hat{k}, \vec{y}(t)] = \frac{1}{2} \overline{g}[\hat{r}=\hat{k}^\perp, \vec{y}(t)] = Re\, G_r(\hat{k}, p=\hat{k}\cdot\vec{y}(t)) \qquad (17)$$

This equation can also be written as $$\overline{g}[\hat{r}, \vec{y}(t)] = 2\, Re\, G_r(\hat{k}=\hat{r}^\perp, p=\hat{r}^\perp\cdot\vec{y}(t)) \qquad (18)$$

Using Eq. (14) and Eq. (16), the following consistency condition on the fan-beam projection data may be derived $$\bar{g}[\hat{r}_0, \vec{y}(t_0)] = \frac{2}{\pi} \wp \int_{-\infty}^{+\infty} dp' \frac{\mathrm{Im} G_r(\hat{r}_0^\perp, p')}{p' - \hat{r}_0^\perp \cdot \vec{y}(t_0)} \quad (19)$$

$$\mathrm{Im} G_r(\hat{r}_0^\perp, p' = \hat{r}_0^\perp \cdot \vec{y}(t)) = -\frac{1}{2\pi} \int_0^{2\pi} d\varphi \frac{\bar{g}[\hat{r}, \vec{y}(t)]}{\hat{r}_0^\perp \cdot \hat{r}}. \quad (20)$$

In order to obtain one specific attenuation profile of projection data $\bar{g}[\hat{r}_0, \vec{y}(t_0)]$ from Eq. (19), all the possible values of $\mathrm{Im}\, G_r(\hat{k}, p)$ are required at the specific orientation $\hat{k}=\hat{r}_0^\perp$. Therefore, it is important to have a scanning path that fulfills at least the short-scan requirement, viz. angular coverage of the source trajectory of 180°+fan angle. Thus, an individual projection at a specific view angle is linked to the projection data measured from all the different view angles via Eqs. (19) and (20). In other words, an individual attenuation profile can be estimated from all the available projection data. The novel fan-beam data consistency condition (FDCC) in Eq. (19) and Eq. (20) is the basis for the data correction method according to the present invention.

DESCRIPTION OF THE PREFERRED EMBODIMENT

Figure 9:
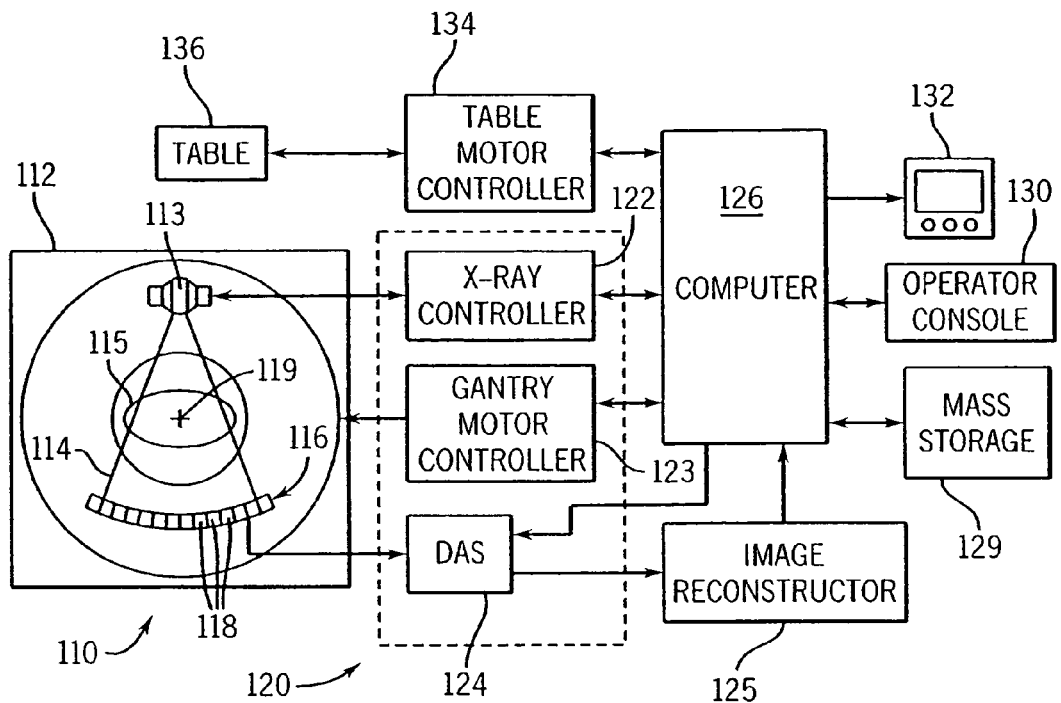
FIG. 9 is a block diagram of a preferred embodiment of an x-ray CT system which employs the present invention.

With initial reference to FIG. 9, a computed tomography (CT) imaging system 110 includes a gantry 112 representative of a "third generation" CT scanner. Gantry 112 has an x-ray source 113 that projects a fan-beam of x-rays 114 toward a detector array 116 on the opposite side of the gantry. The detector array 116 is formed by a number of detector elements 118 which together sense the projected x-rays that pass through a medical patient 115. Each detector element 118 produces an electrical signal that represents the intensity of an impinging x-ray beam and hence the attenuation of the beam as it passes through the patient. During a scan to acquire x-ray projection data, the gantry 112 and the components mounted thereon rotate about a center of rotation 119 located within the patient 115.

The rotation of the gantry and the operation of the x-ray source 113 are governed by a control mechanism 120 of the CT system. The control mechanism 120 includes an x-ray controller 122 that provides power and timing signals to the x-ray source 113 and a gantry motor controller 123 that controls the rotational speed and position of the gantry 112. A data acquisition system (DAS) 124 in the control mechanism 120 samples analog data from detector elements 18 and converts the data to digital signals for subsequent processing. An image reconstructor 125, receives sampled and digitized x-ray data from the DAS 124 and performs high speed image reconstruction according to the method of the present invention. The reconstructed image is applied as an input to a computer 126 which stores the image in a mass storage device 129.

The computer 126 also receives commands and scanning parameters from an operator via console 130 that has a keyboard. An associated cathode ray tube display 132 allows the operator to observe the reconstructed image and other data from the computer 126. The operator supplied commands and parameters are used by the computer 126 to provide control signals and information to the DAS 124, the x-ray controller 122 and the gantry motor controller 123. In addition, computer 126 operates a table motor controller 134 which controls a motorized table 136 to position the patient 115 in the gantry 112.

The fan-beam data consistency condition (FDCC) derived generally above is applied to this preferred geometry by restricting the motion of the x-ray source $\vec{y}(t)$ to a circle centered at the origin "0" with a radius R. The scanning path is parameterized by a polar angle t shown in FIG. 6. Therefore, we have the following parameterization of the source trajectory $$\vec{y}(t)=R(\cos t, \sin t). \quad (21)$$

In addition, it is also useful to consider the following parameterizations for the unit vectors r, $\hat{r}_0$, and $\hat{r}_0^\perp$ in the laboratory coordinate system:

$$\hat{r}=(\cos \phi, \sin \phi), \quad (22)$$

$$\hat{r}_0=(\cos \phi_0, \sin \phi_0), \quad (23)$$

$$\hat{r}_0^\perp=(-\sin \phi_0, \cos \phi_0) \quad (24)$$

For convenience, the notation $g_m(\gamma, t)$ is used to describe the measured fan-beam projections with an equi-angular curved detector. The projection angle $\gamma$ is in the range $$[-\frac{\gamma_m}{2}, \frac{\gamma_m}{2}]$$

where $\gamma_m$ is the fan angle. By definition, $$g_m(\gamma,t)=\bar{g}[\hat{r}, \vec{y}(t)] \quad (25)$$

with the following relation between $\phi$ and $\gamma$ $$\phi \pm \pi + t + \gamma \quad (65)$$

In practice, it is beneficial to introduce the following definitions:

$$\mathrm{Im}\, G_r(\hat{r}_0^\perp, p')=F_p(\phi_0, p')=F_t(\phi_0, t) \quad (27)$$

$$p'=\hat{r}_0^\perp \cdot \vec{y}(t)=R \sin(t-\phi_0) \quad (28)$$

$$\phi_0=\pi+t_0+\gamma_0 \quad (29)$$

In the second equality in Eq. (27), a data rebinning has been introduced via Eq. (28).

Using these definitions, the FDCC of Eq. (19) and Eq. (20) for this geometry may be expressed as follows:

$$g_m(\gamma_0, t_0) = \frac{2}{\pi} \int_{-\infty}^{+\infty} dp' \frac{1}{p_0 - p'} F_p(\varphi_0, p') \quad (30)$$

and $$F_p(\varphi_0, p') = F_t(\varphi_0, t) = \frac{1}{2\pi} \int_{-\gamma_m/2}^{+\gamma_m/2} d\gamma \frac{1}{\sin(\varphi_0 - t - \gamma)} g_m(\gamma, t), \quad (31)$$

where the number $p_0$ in Eq. (30) is given by:

$$p_0=R \sin \gamma_o. \quad (32)$$

Eqs. (30) and (31) explicitly relate the attenuation data in a single projection to the measured attenuation data in all of the other view angles. Given a desired projection attenuation value labeled by parameters $\gamma_0$ and $t_0$, the numerical procedure to estimate this specific attenuation value may be summarized in the following three steps:

Step 1: For each of the other view angles, filter the measured data by a filtering kernel $$\frac{1}{\sin\gamma}$$

to obtain $F_1(\phi_0,t)$ as set forth in Eq. (31).

Step 2: Rebin the filtered data $F_f(\phi_0,t)$ into $F_p(\phi_o, p')$ as set forth in Eq. (28).

Step 3: Filter the rebinned data $F_p(\phi_0, p')$ by a Hilbert kernel $$\frac{1}{p'}$$

to obtain the estimated projection data $g_m(\gamma_0, t_0)$ as set forth in Eq. (30).

Figure 1:
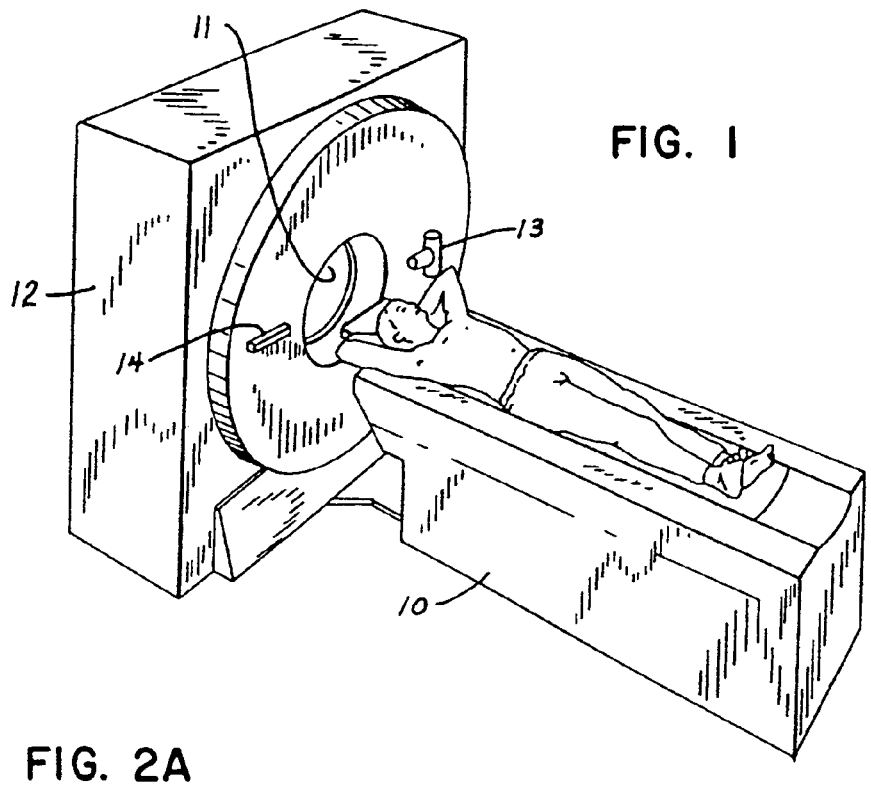
FIG. 1 is a perspective view of an x-ray CT system which employs the present invention.
Figure 2A:
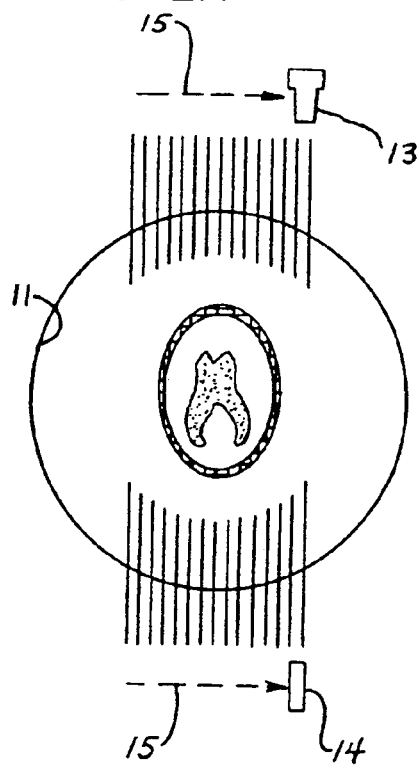
FIGS. 2A and 2B are pictorial representations of a parallel beam and fan-beam scan respectively that may be performed with a CT system.
Figure 2B:
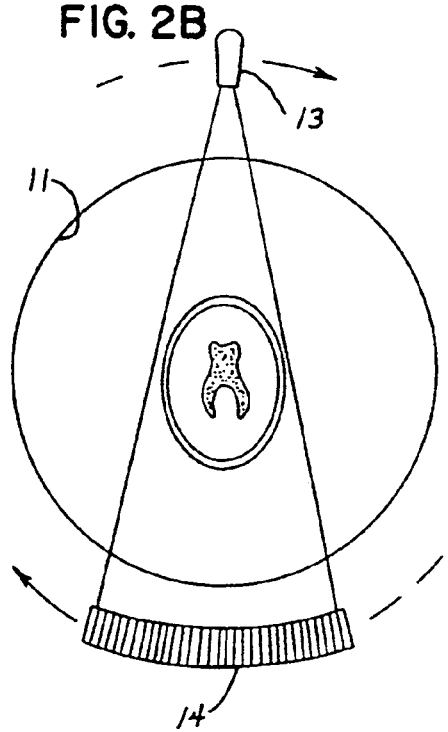
Figure 3:
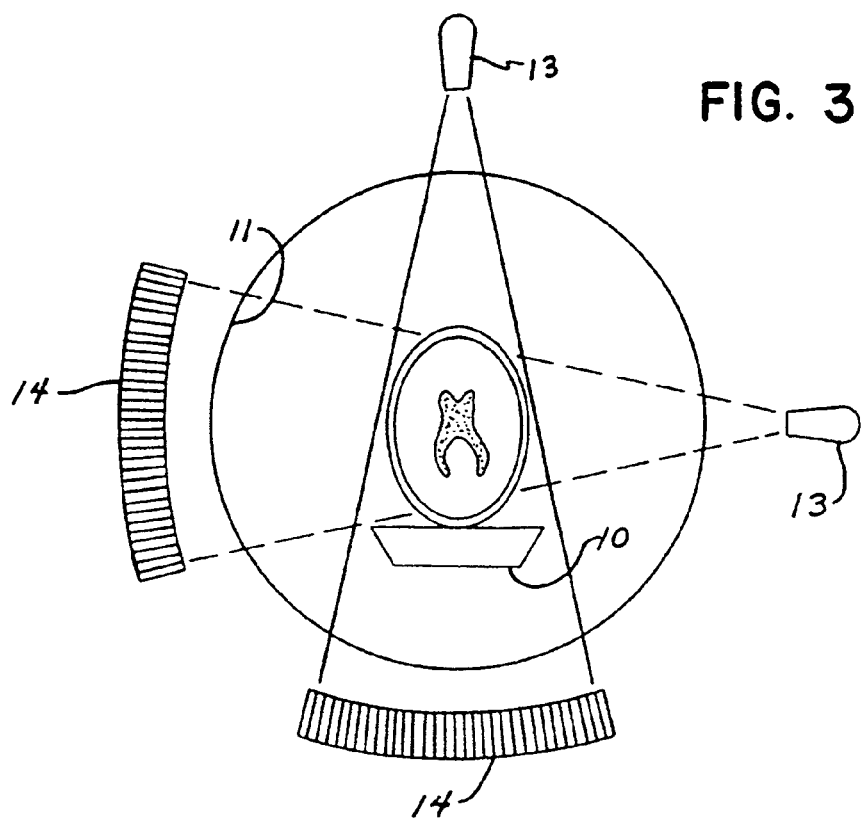
FIG. 3 is a pictorial representation of a fan-beam acquisition situation which results in a data truncation problem that is solved using the present invention.
Figure 4:
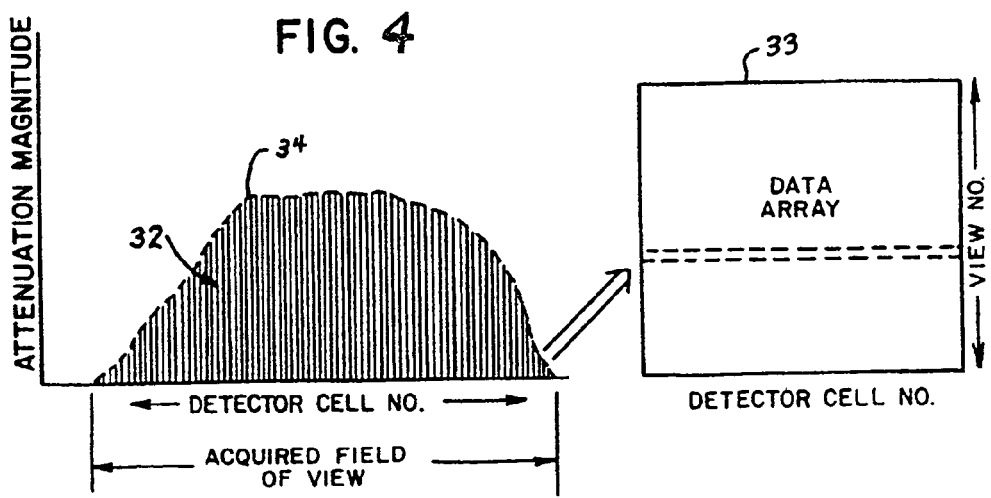
FIG. 4 is a pictorial representation of an attenuation profile acquired by the system of FIG. 1 and its storage in a data array.
Figure 5A:
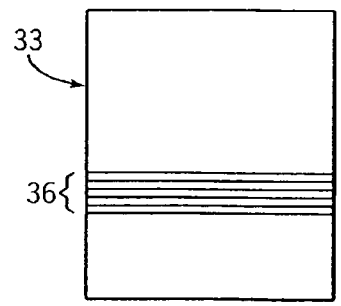
FIGS. 5A and 5B are pictorial representations of the data array of FIG. 4 illustrating data that may be corrupted by two problems encountered when scanning subjects with the system of FIG. 1.
Figure 5B:
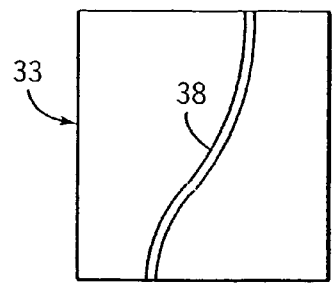
Figure 10:
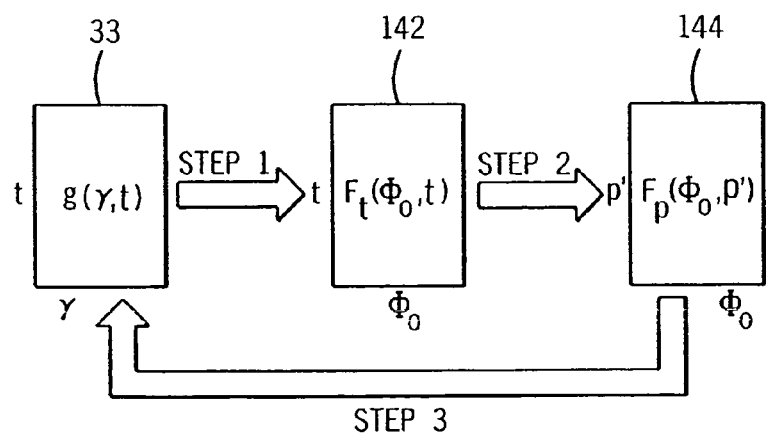
FIG. 10 is a pictorial representation of the data structures that are produced when practicing the steps of the present invention.

This process is implemented by a program executed by the computer 126 after the scan is completed and the acquired attenuation data $g_m(\gamma_0, t_0)$ is stored in data array 33. As shown in FIG. 10, the above step 1 is performed on the entire data set 140 to produce data set $F_f(\phi_0, t)$ which is stored as array 142. This data set is rebinned as described above in step 2 to form $F_p(\phi_0, p')$ which is stored in data array 144. The attenuation values $g_m(\gamma_0, t_0)$ at any view angle $t_0$ can then be estimated using the data in array 144 and Eq. (30) as described above in step 3. It can be appreciated that any acquired attenuation profile can be estimated in this manner in its entirety, or only a particular attenuation value therein may be estimated. Thus, in the truncated data problem illustrated in FIG. 5A, the views 36 in the acquired data array 33 are replaced with estimated values, whereas in the absorbed x-ray problem illustrated in FIG. 5B, the corrupted attenuation values 38 in the data array 33 are replaced with estimated values.

It should be apparent that the method can be repeated using the corrected attenuation data array 33 to further improve the results. Such an iterative process is normally not necessary when only a small amount of the acquired data is corrupted, but further iterations are required as the proportion of corrupted data increases.

While the present invention is described with reference to fan-beam x-ray CT systems, it is also applicable to other imaging modalities such as radiation therapy systems and PET/CT systems. Projection data acquired with a fan, or divergent, beam may be estimated using the present invention where projection data is acquired from the same subject at a sufficient number of other projection angles.

The invention claimed is:

1. A method for correcting selected attenuation values in an array of attenuation values acquired with a fan-beam x-ray CT system, the steps comprising:
   a) filtering the attenuation values in the array with a first filtering kernel;
   b) rebinning the filtered attenuation values; and
   c) calculating estimates of the selected attenuation values by filtering the rebinned attenuation values with a second filtering kernel.

2. The method as recited in claim 1 in which the second filtering kernel is a Hilbert kernel.

3. The method as recited in claim 1 in which the first filtering kernel is 1/sin, where is the projection angle of an x-ray which produces an attenuation value as measured from the midpoint of the fan-beam.

4. A method for estimating fan-beam projection data acquired from a subject at a selected projection angle, the steps comprising:
   a) acquiring fan-beam projection data from the subject at other projection angles; and
   b) estimating the fan-beam projection data from the acquired fan-beam projection data using a fan-beam data consistency condition.

5. The method as recited in claim 4 in which the fan-beam projection data is an x-ray attenuation profile acquired with a CT imaging system.

6. The method as recited in claim 4 in which step b) includes:
   i) filtering the acquired fan-beam projection data with a first filtering kernel;
   ii) rebinning the filtered fan-beam projection data; and
   iii) calculating estimates of the fan-beam projection data by filtering rebinned projection data with a second filtering kernel.

7. The method as recited in claim 6 in which the second filtering kernel is a Hilbert kernel.

8. The method as recited in claim 6 in which the first filtering kernel is l/sin$\gamma$, where $\gamma$ is the projection angle of a beam which produces a value in the projection data as measured from the midpoint of the fan-beam.

* * * * *